June 16, 1931. W. L. BURNER 1,810,639
DUMP CAR
Filed Jan. 18, 1929 3 Sheets-Sheet 1

Witness
Milton Lenoir

Inventor.
William L. Burner,
By Brown, Jackson, Boettcher & Dienner.
Attorneys

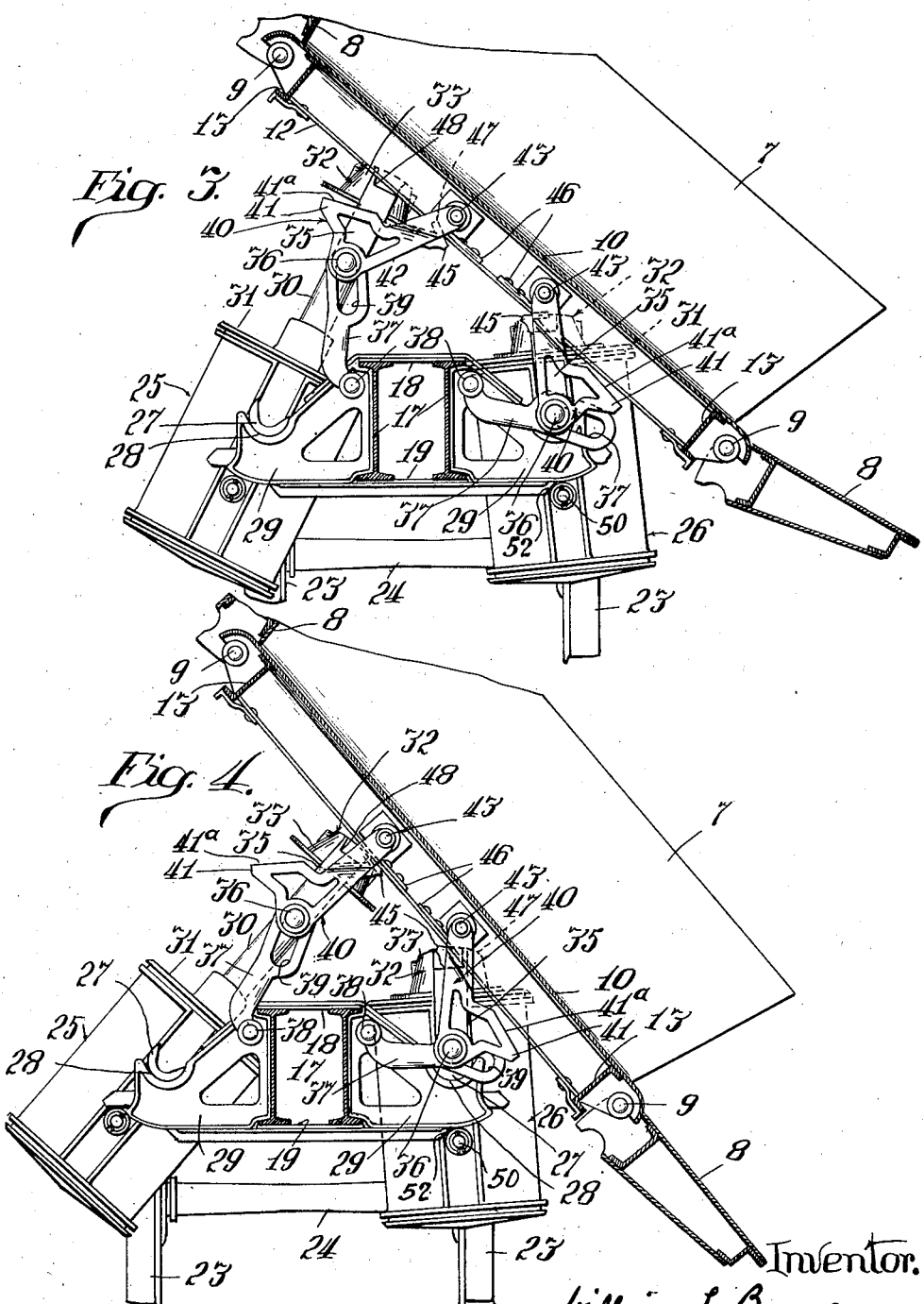

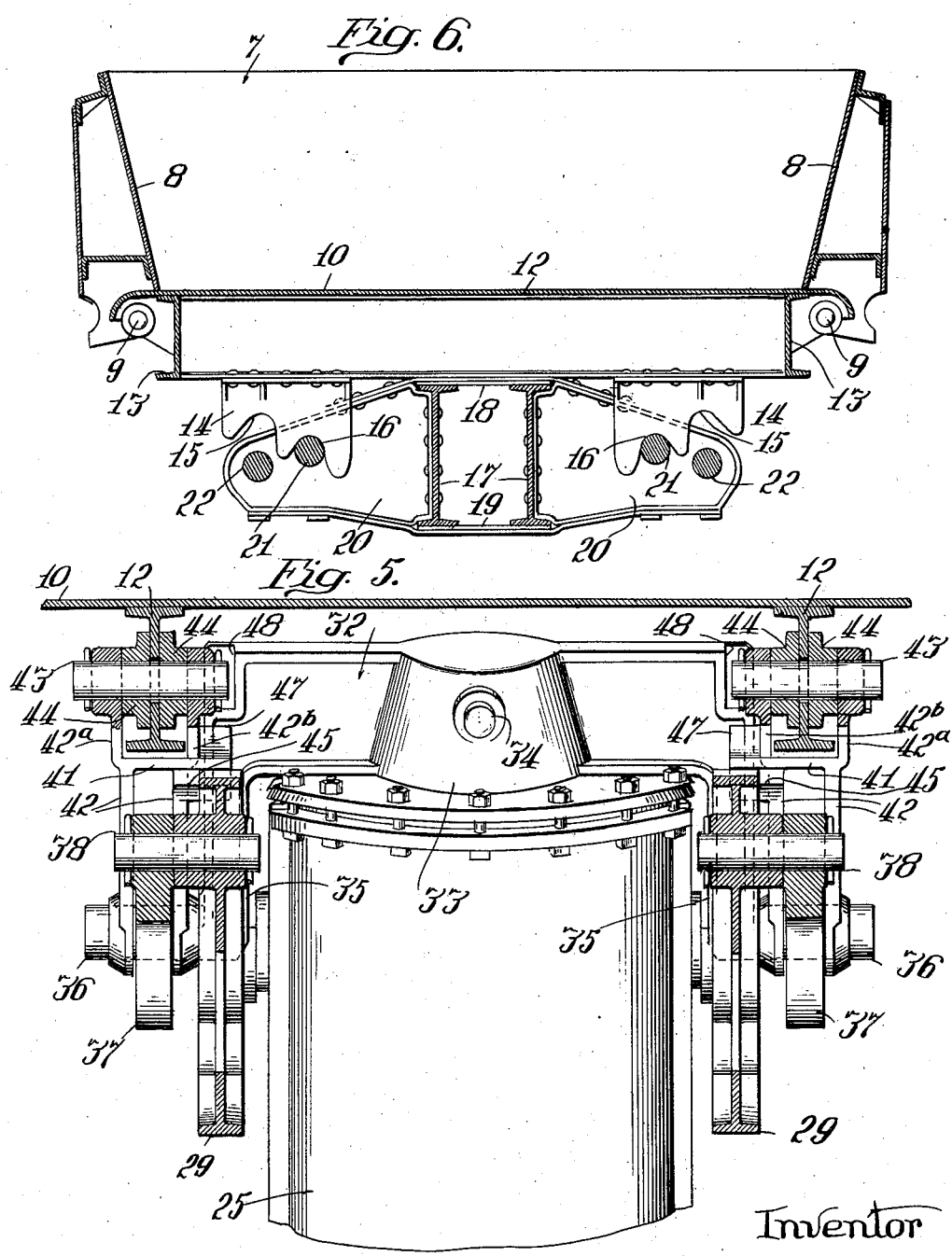

Patented June 16, 1931

1,810,639

UNITED STATES PATENT OFFICE

WILLIAM L. BURNER, OF COLUMBUS, OHIO, ASSIGNOR TO WESTERN WHEELED SCRAPER COMPANY, OF AURORA, ILLINOIS, A CORPORATION OF ILLINOIS

DUMP CAR

Application filed January 18, 1929. Serial No. 333,436.

This invention relates to dump cars in which the car body or bed is tilted to discharge its load by the operation of one or more compressed air actuated pistons operating in cylinders mounted on the underbody of the car. Usually, in such cars the bed is arranged to be tilted to discharge its load at either side of the car, and I have illustrated my improvements as embodied in a car having a bed adapted to be tilted in either direction, but they may also be incorporated in a car which dumps at one side only.

It is common practice to provide compressed air cylinder and piston mechanism at opposite sides of the under body, the mechanism at either side being employed to tilt the bed toward the other side, while the mechanism at the dumping side may be employed to right the bed if it be of a type that is not self-righting.

It is also common practice either to mount the car bed so that it will rock about a fixed axis centrally located with respect to the underbody, or to mount it to rock about rocker supports located adjacent to the opposite sides of the under body, in which case it is usually self-righting, through the action of gravity. In the latter construction the bed swings through a longer arc, and in order to insure complete dumping of the load it is necessary that the dumping mechanism be capable of elevating the high side of the bed to a higher point than where the bed rocks about a centrally disposed pivotal point.

It will be understood, of course, that in the dumping operation the greatest power must be exerted during the first part of the dumping stroke, since the load is not then overbalanced, but after the bed has been tilted to some extent that part of the load at the dumping side becomes preponderant and aids in the dumping operation, thereby reducing the effort required to complete the tilting of the bed to its extreme dumping position. While this is true whether the bed be mounted to tilt about a fixed axis, or to rock about rocker supports adjacent to the sides of the under body, where the latter construction is used it is particularly desirable that the dumping mechanism be so constructed that its leverage upon the car bed will be at the maximum during the early stages of the lifting operation, where greater power is required, and that during the later stages, where less effort is necessary, such leverage will be reduced, thereby enabling the bed to be rocked through a greater arc, and at accelerated speed, for a given movement of the piston, and consequently making it practicable to employ a comparatively short cylinder with a correspondingly short piston stroke. Without this differential leverage feature, or some other compensating arrangement, such, for example, as that disclosed in my pending application, Serial No. 242,367, filed December 24, 1927, it would be necessary to employ a cylinder long enough to accommodate a piston having such length of stroke that its range of movement would be sufficient to lift the high side of the bed high enough to complete the dumping operation.

My present invention has for its object to provide an improved construction by which such short cylinder and piston mechanism can be satisfactorily employed. I accomplish this object as illustrated in the drawings and described in the specification. What I regard as new is set forth in the claims.

In the accompanying drawings,—

Fig. 3 is a view similar to Fig. 2, illustrating a later stage;

Fig. 4 is a similar view illustrating the final or full dumping stage;

Figure 1:
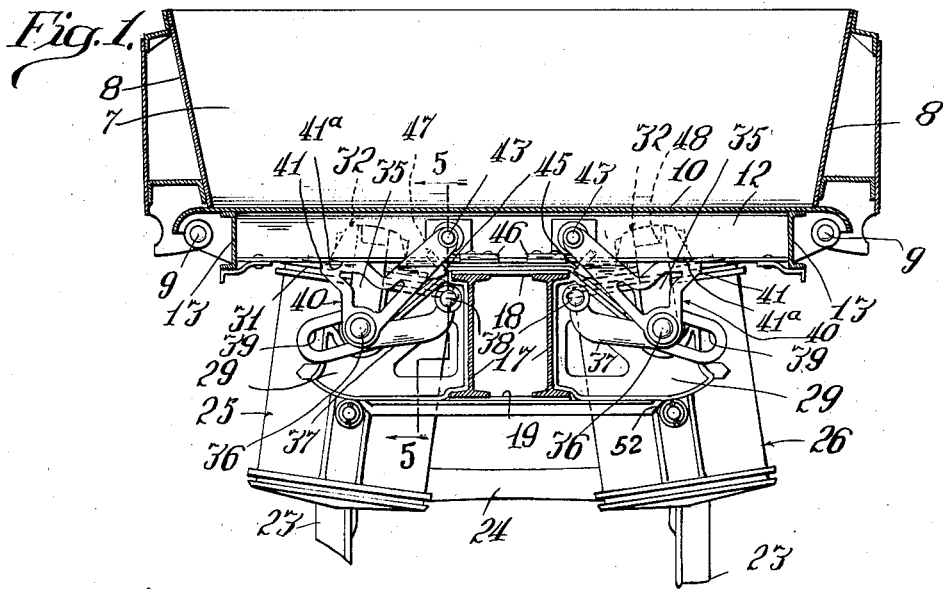
Fig. 1 is a vertical cross-section of a dump car illustrating the relative positions of the car bed and dumping cylinders, together with the connections by means of which the tilting of the bed is effected, the parts being shown in their normal or transport position.

Fig. 5 is a partial longitudinal vertical sectional view on line 5—5 of Fig. 1, illustrating the connections between the dumping mechanism and the car bed; and Fig. 6 is a vertical cross-section showing one form of mounting for the car bed so that it may rock upon supports adjacent to the opposite sides of the underbody. This form of mounting is preferred, although the bed may be mounted in any other suitable way.

Figure 2:
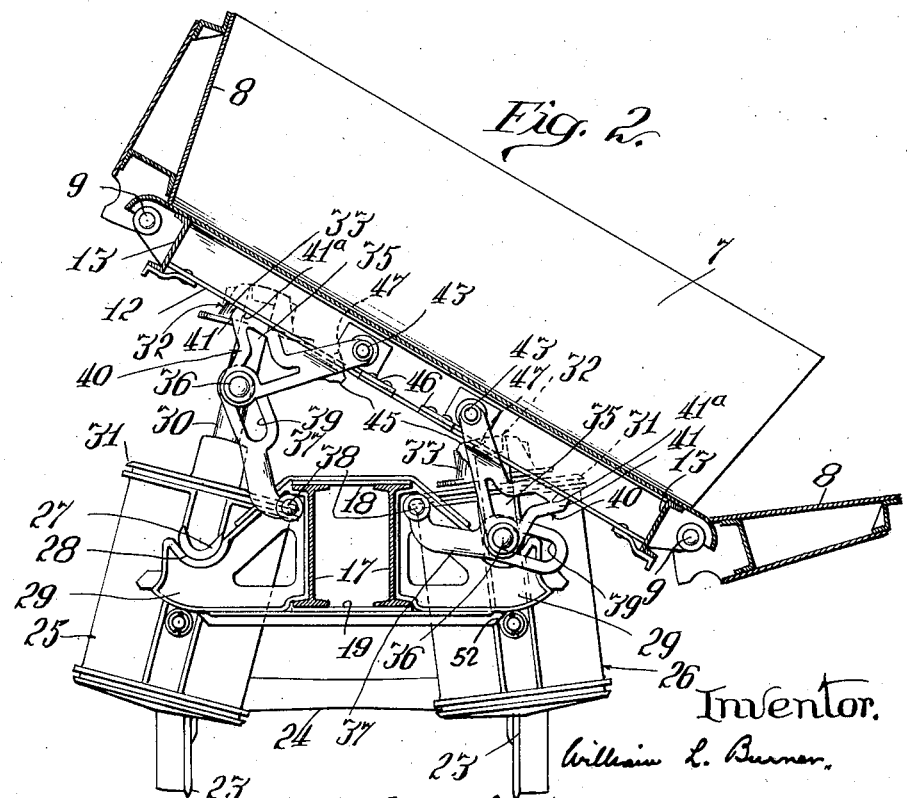
Fig. 2 is a similar view illustrating the first stage of the dumping operation.

Referring to the drawings,—7 indicates the car bed which, as usual, is provided with side gates 8 at its opposite sides pivoted adjacent to their lower margins on pivotal supports 9 so that the gates may swing downward and outward, as illustrated in Figs. 2, 3 and 4.

Any suitable means may be provided for controlling the position of these side gates, but it should be of such character that the gate at the dumping side swings downward and outward during the dumping operation, while the gate at the high side of the bed remains closed, or approximately so. It should be understood also that so far as my present invention is concerned the gates need not be arranged to swing downward and outward in dumping, as gates pivoted at their upper margins, or otherwise mounted in any other suitable way to permit the discharge of the load, may be employed.

In the construction illustrated the bed is provided wtih a sheet metal floor 10 which rests on I-beams 12 that extend transversely of the bed. These I-beams are secured at their ends to channel beams 13 that form the side sills of the bed and together with the I-beams 12 make up a strong rigid frame structure that forms the bottom of the bed.

Secured to and depending from the bottom of the bed adjacent to its opposite margins are several brackets or rockers 14, each of which, in the illustrated construction, is provided with two recesses 15, 16 at different distances from the center of the car. Any suitable number of these brackets may be provided spaced along the length of the car.

The underbody of the car, in the illustrated arrangement, comprises two longitudinally disposed I-beams 17, which together with top and bottom plates 18, 19, which rigidly connect said I-beams together, constitute the center sill of the underbody.

Pairs of transverse frames 20 connected with the center sill in any approved way, as by rivets, are provided at suitable points and carry longitudinally extending cylindrical bearings 21, 22, arranged in pairs adjacent to the ends of said frames, so that they underlie the brackets 14. The bearings 21 are adapted to engage in the recesses 16 of the brackets 14, and the bearings 22 are adapted to engage in the recesses 15 of said brackets. When the car bed is in its normal position it is supported upon the bearings 21, but when it is tilted in either direction the brackets 14 are rocked to cause their recesses 15 to engage the bearings 22 at one side or the other of the car. When this occurs, of course, the brackets 14 at the high side of the car are moved out of engagement with their bearings, as that side of the car bed rises to the positions shown in Figs. 2, 3 and 4. Obviously the above described arrangement of the bearings and brackets could be reversed, if desired, the brackets being mounted on the under body and the bearings on the car bed.

The under body comprises the usual trucks, of which the wheels 23 and axles 24 only are shown. Also mounted on the under body are a series of dumping cylinders 25, 26, one or more of such cylinders being provided at each side of the car, depending upon the length of the car. Ordinarily two of such cylinders, located approximately midway between the longitudinal center of the car and its ends, are sufficient. While for convenience of description the cylinders at opposite sides of the car are indicated by different reference numerals, inasmuch as the dumping mechanisms at both sides of the car are alike the corresponding parts thereof, except the cylinders, will be indicated by like reference numerals.

In the dumping operation it is necessary that the cylinders 25, 26 be capable of oscillating transversely of the car, and, therefore, they are provided with trunnions 27 at their opposite sides that rest in bearings 28 in transversely disposed brackets 29 that are secured to the I-beams 17 at opposite sides of the car in any suitable way. These brackets are arranged in pairs with the members of each pair at opposite sides of the cylinder, which oscillates between them. Pins or studs 50 project laterally from opposite sides of each cylinder and underlie the curved surfaces 51 formed along the under sides of the brackets 29. Such pins or studs are also adapted to abut shoulders 52 formed by a member 53. The engagement of the pins 50 against the shoulders 52 limits the extent to which the lower end of the cylinder can swing inwardly, and also prevents any possibility of the cylinder being lifted off its trunnion support 28 in the event that the bed should be tilted by hand or from some other source of power.

Within each cylinder 25, 26 is a piston having a piston rod 30 that projects through the upper head 31 of the cylinder, and at its outer end is pivotally connected with the central portion of a cross-head 32 that extends longitudinally of the car. Preferably each of these cross-heads is provided with a centrally located bell-shaped portion 33 that carries a transversely disposed pivot pin 34 by which the upper end of the piston rod is connected with the cross-head, the piston extending up into the bell so that its upper end is enclosed by it. Each cross-head is substantially U-shaped, being provided at its ends with depending arms 35 that extend downwardly at opposite sides of the upper end of the cylinder and carry outwardly extending pivot pins 36 so located that when the piston rod 30 is fully withdrawn into its cylinder the pivots 36 carried by its cross-head will then have been carried down so that they lie in the concave upper surfaces of the trunnions 27, as best shown in Fig. 1. At each side of each cylinder 25, 26, links 37 are provided, the lower ends of which are pivotally connected at 38 to the brackets 29, so that said links may swing vertically in transverse planes. The upper portions of said links are provided with longitudinally extending slots 39 which are threaded on the pivots 36, so that such links serve to limit the outward movement of the pistons 30 and also to cause the cylinders 25, 26 to oscillate in the manner and for the purpose hereinafter described.

It will be seen from Fig. 1 that when the car bed is in its normal or transport position the links 37, which are pivoted to the brackets 29 adjacent to the upper inner portions of the cylinders, then lie approximately at right angles to said cylinders, but as shown in Figs. 2, 3 and 4, when the pistons 30 at one side of the car are projected the slotted ends of the links associated with such pistons are carried upward, thereby reducing the angle of the links to the piston rod. Until the pivots 36 reach the outer ends of the slots 39 the links 37 perform no function, but when that point is reached the pistons can be projected further only by still further reducing the angle of the links 37 to the piston rods, and this result can be accomplished only by oscillating the cylinders and piston rods to move their upper ends inwardly or toward the center of the car. This operation is illustrated in Figs. 2, 3 and 4, the latter figure showing the piston rods 30 projected to the fullest extent, at which time the links 37 are approximately alined with said piston rods.

Also pivotally connected with each pivot pin 36 is a dumping member 40, the upper and lower portions of which are both bifurcated to provide parallel members that are spaced apart. The lower parallel members straddle the link 37 and are pivotally mounted on the pivot pin 36, and they extend upwardly and outwardly to form shoulders 41 having substantially flat upper surfaces 41ª that contact with the under surface of the adjacent floor beam 12 when the car bed is in its normal position and during the first stage of the dumping operation, as shown in Figs. 1 and 2.

The bifurcated upper end portion of the dumping member 40 is in the form of parallel arms 42 spaced apart, which arms extend inwardly and upwardly to straddle the floor beam 12 with which they are pivotally connected by a pivot pin 43, as best shown in Fig. 5. Spacers 44 are preferably provided between the upper ends of the arms 42 and the opposite surfaces of the web portion of the floor beam 12. As shown in Fig. 5, the pivot pin 43 extends through the upper portions 42ª, 42ᵇ of the arms 42, and also through the spacers 44 and the floor beam 12. It should be noted that the arms 42 normally project inwardly from the piston rods 30 with which they are associated, and that the pivot points 43 are located quite close to the transverse center of the car. As clearly shown in Fig. 1, when the car bed is in its normal position, the upper surfaces of the shoulders 41 bear against the under sides of the floor beams 12 somewhat outside of the line of the piston 30, while the pivot 43 lies a considerable distance inside of such line. The bell-shaped portion 33 of the cross head 32 lies midway between two adjoining floor beams 12, as best shown in Fig. 5.

When air is admitted to the cylinder or cylinders at one side of the car, as for example the cylinders 25, the ensuing outward movement of the piston 30 thrusts upward on the outer end portions of the floor beams 12 at that side of the car through the shoulders 41, thereby lifting that side of the bed. When the bed has been tilted to an angle of approximately thirty degrees the parts will assume the position shown in Fig. 2, and the pivots 36 will have just reached the upper or outer ends of the slots 39 in the links 37, which will have been swung up to the position shown in said figure. When this point is reached, further outward movement of the piston rod 30 will cause the cylinders 25 to oscillate so that their upper ends will swing inward, or toward the center of the car, thereby swinging the links 37 in a clockwise direction.

This oscillatory movement of the cylinders, with the consequent inward movement of the pivot pins 36, will carry the arms 42 of the dumping members more nearly into line with the piston 30, thereby swinging the shoulders 41 out of engagement with the floor beams 12, as shown in Fig. 3, which illustrates the position of the parts when the bed has been tilted approximately to an angle of forty degrees. When this swinging movement of the dumping member occurs it shifts the point of application of power from a point over the shoulders 41 inwardly to the pivot point 43. As the operation continues the oscillation of the cylinder carries its piston toward a position of alinement with the arms 42, until when the piston reaches its extreme outward movement said arms, the piston, and the links 37 are all approximately alined, as best shown in Fig. 4. As this point is approached the arms 42 practically become prolongations of the piston, and carry the bed higher than it would be moved if the length of the piston stroke alone were the measure of its movement. The parts 37 and 42 function substantially as a toggle actuated by the movement of the piston to lift the bed higher than it would be lifted by the direct action of the piston through the same range of movement.

It will be noted that because the point of application of power to the bed is shifted inwardly after the bed has been tilted to an angle of about thirty degrees, the leverage of the dumping mechanism on the bed is reduced, but the speed of the bed for a given movement of the piston is correspondingly increased. Such decrease in the leverage, however, is not objectionable because when the bed has been tilted to such extent the center of gravity of the load will have been shifted toward the dumping side sufficiently so that very little power is thereafter required to complete the dumping operation, and, therefore, the leverage necessary is lessened.

By the construction described it is practicable to use comparatively short cylinders and pistons in the dumping mechanism, as this is compensated for by the effective prolongation of the movement of the piston due to the rocking of the dumping member 42, and to the fact that the point of application of the power to the bed is shifted toward the fulcrum point about which the bed is tilted, during the later stages of the dumping operation. After the load has been discharged the bed will right itself by gravity as soon as the air is exhausted from the cylinders, since the fulcrum point about which the bed is tilted is adjacent to the dumping side of the car.

To prevent the dumping member 40 at the left hand side of the car from swinging too far to the right in the dumping operation, which would interfere with its proper movement during the righting operation, it is provided with an abutment or stop 45, preferably located between the arms 42, which is adapted to engage a stop plate 46 secured to the floor beam 12 adjacent to the pivot point 43 so that when the car bed has been tilted to the fullest extent said abutment will strike the stop plate 46 and prevent further swinging in the same direction of the dumping member 40, as shown in Fig. 4.

Ordinarily, it is unnecessary to admit air to the cylinder at the dumping side to right the bed, as it will right itself by gravity after the load has been discharged, but sometimes it may be desirable to admit air to such cylinder to start the bed back toward its normal position.

When the car bed has been tilted to its extreme position the dumping mechanism at the dumping side of the car assumes the position shown in Figure 4, at which time the pivot point 43 of such dumping mechanism will be in a position slightly to the right of the axial line of the piston rod 30 of the cylinder with which it is associated and it will be noted that any air admitted to the cylinder at the dumping side of the bed at this time will raise the bed off of its trunnion 22. In order to prevent the car body from shifting to the right and downward when this occurs I provide the dumping members 40 with stops in the form of laterally projecting lugs 47 carried by the inner arms 42 of each pair. These lugs 47 are adapted to engage in recesses 48 at the opposite ends of the cross-head 32. By reason of these lugs 47 engaging in the recesses 48 the dumping members 40 are made rigid with the piston rod 30 against outward movement and hence any outward and downward movement of said members around the pivot 36 is effectually prevented. The weight of the bed, acting outwardly and downwardly upon the dumping members 40, tends to press the lugs 47 into the recesses 48 on the cross-head 32 which in turn tends to pivot the upper end of the cylinder 26 outwardly about its trunnions 27. However, the pins or studs 50 projecting from the cylinder are at this time engaging against the shoulder 52 of the member 53, and the upper end of the cylinder cannot, therefore, swing outwardly, and the dumping members being held rigid with respect to the piston rod effectually resist any outward and downward shifting of the bed. Also, by reason of the dumping members 40 being held rigid with the piston rod 30 when the air is exhausted from the cylinder 26 the bed will drop down again squarely upon its trunnions 22.

I wish it to be understood that while I have described in detail the embodiment of my invention illustrated in the accompanying drawings, the claims hereinafter made are not intended to be limited to such particular construction as various modifications that come within the scope of the generic claims will readily occur to those familiar with the art. It is to be understood also that the term "dump car" as used in the appended claims is intended to comprehend not only railway cars, but also other vehicles having dumping bodies.

I claim:

1. A dump car comprising an under body, a tilting bed mounted thereon and adapted to tilt to either side thereof, and power operated means for tilting the bed to dump the load, including means for applying upward thrust to the bed at a point comparatively remote from the dumping side thereof during an early stage of the dumping operation, and for shifting the point of application of such thrust to the bed toward its dumping side at a later stage of the dumping operation.

2. A dump car comprising an under body, a tilting bed mounted thereon, and power operated means for tilting the bed to dump the load, including a fluid pressure operated piston, and means actuated by said piston to apply upward thrust to the bed at a point comparatively remote from the dumping side thereof during an early stage of the dumping operation, and to shift the point of application of such thrust to the bed toward its dumping side at a later stage of the dumping operation.

3. A dump car comprising an under body, a tilting bed mounted thereon, and power operated means for tilting the bed to dump the load, including a fluid pressure operated piston rod, and a dumping member pivotally connected with the bed and actuated by projection of the piston rod to apply upward thrust to the bed at a point comparatively remote from the dumping side thereof during an early stage of the dumping operation, and to shift the point of application of such thrust to the bed toward its dumping side at a later stage of the dumping operation.

4. A dump car comprising an under body, a tilting bed mounted thereon, and power operated means for tilting the bed to dump the load, including a fluid pressure operated piston rod, and a dumping member pivotally connected with the bed to swing toward and from the dumping side thereof and actuated by projection of the piston rod to apply upward thrust to the bed outside its pivotal connection therewith during an early stage of the dumping operation, and to apply such upward thrust nearer to such pivotal connection during a later stage of the dumping operation.

5. A dump car comprising an under body, a tilting bed mounted thereon, and power operated means for tilting the bed to dump the load, including a fluid pressure operated piston rod, and a dumping member pivotally connected with the bed, at a point normally lying between the axial line of the piston rod and the dumping side of the bed, to swing toward and from such dumping side, and actuated by projection of the piston rod to apply upward thrust to the bed at a point outside of its pivotal connection therewith during an early stage of the dumping operation, and to apply such thrust nearer to such pivotal connection at a later stage of the dumping operation.

6. A dump car comprising an under body, a tilting bed mounted thereon, and power operated means for tilting the bed to dump the load, including a fluid pressure operated piston, and a dumping member pivotally connected with the bed to swing toward and from the dumping side thereof and adapted to bear against the bed at a point outside its pivotal connection therewith to transmit upward thrust to the bed during an early stage of the dumping operation, and means for swinging said dumping member during a later stage of the dumping operation to transmit upward thrust therethrough to the bed at a point nearer the dumping side thereof.

7. A dump car comprising an under body, a tilting bed mounted thereon, and power operated means for tilting the bed to dump the load, including a fluid pressure operated piston, and a dumping member pivotally connected with the bed to swing toward and from the dumping side thereof and adapted to bear against the bed at a point outside its pivotal connection therewith to transmit upward thrust to the bed during an early stage of the dumping operation, and means for swinging said dumping member during a later stage of the dumping operation to transmit upward thrust to the bed through said pivotal connection.

8. A dump car comprising an under body, a tilting bed mounted thereon, power operated means for tilting the bed to dump the load, including a fluid pressure operated piston, adapted by its projection to apply upward thrust to the bed, and toggle mechanism interposed between the piston and the bed and actuated by the piston to apply upward thrust to the bed at a point comparatively remote from the dumping side thereof during an early stage of the dumping operation, and to shift the point of application of such thrust to the bed toward the dumping side thereof at a later stage of the dumping operation.

9. A dump car comprising an under body, a tilting bed mounted thereon, power operated means for tilting the bed to dump the load, including an oscillating cylinder mounted on the under body, a fluid pressure operated piston operating in said cylinder and having a piston rod adapted to be projected to tilt the bed, and means actuated by the upward projection of the piston rod to swing said rod relatively to the bed toward the dumping side of the bed.

10. A dump car comprising an under body, a tilting bed mounted thereon, power operated means for tilting the bed to dump the load, including an oscillating cylinder mounted on the under body, a fluid pressure operated piston operating in said cylinder and having a piston rod adapted to be projected to tilt the bed, means actuated by the projection of the piston rod to swing the same toward the dumping side of the bed, and means actuated by the projection of the piston rod to first apply upward thrust to the bed at a point comparatively remote from the dumping side thereof, and to subsequently shift the point of application of such thrust to the bed toward the dumping side thereof.

11. A dump car comprising an under body, a tilting bed mounted thereon, power operated means for tilting the bed to dump the load, including an oscillating cylinder mounted on the under body, a fluid pressure operated piston operating in said cylinder and having a piston rod adapted to be projected to tilt the bed, means actuated by the projection of the piston rod to swing the same toward the dumping side of the bed, a cross head connected with the piston rod, and a dumping member pivotally connected with said cross head, and pivotally connected with the bed between the axial line of said piston rod and the dumping side of the bed, said dumping member being adapted to be actuated by the projection of the piston to apply upward thrust to the bed at a point outside of its pivotal connection with the bed, during an early stage of the dumping operation, and to transmit upward thrust to the bed at a point nearer such pivotal connection at a later stage of the dumping operation.

12. A dump car comprising an under body, a tilting bed mounted thereon, power operated means for tilting the bed to dump the load, including a fluid pressure operated piston rod adapted by its projection to apply upward thrust to the bed, and power transmitting means pivotally connected with the bed and normally extending outwardly relatively to its pivot at an angle to the piston rod, said power transmitting means being movable into substantial alinement with said piston rod during a later stage of the dumping operation.

13. A dump car comprising an under body, a tilting bed mounted thereon, power operated means for tilting the bed to dump the load, including a fluid pressure operated piston rod adapted by its projection to apply upward thrust to the bed, power transmitting means pivotally connected with the bed and normally extending outwardly from said pivotal connection at an angle to the piston rod, and means pivotally connected with said power transmitting means and with the under body and operable by the projection of the piston rod to move said power transmitting means toward a position of alinement with said piston rod.

14. A dump car comprising an under body, a tilting bed mounted thereon, power operated means for tilting the bed to dump the load, including a fluid pressure operated piston rod, power transmitting means pivotally connected with the bed at a point normally lying at the inner side of said piston rod, and means connected with said power transmitting means and with the under body and actuated by the projection of the piston to move said power transmitting means toward a position of alinement with said piston rod.

15. A dump car comprising an under body, a tilting bed mounted thereon, power operated means for tilting the bed to dump the load, including an oscillating cylinder mounted on the under body, a fluid pressure operated piston operating in said cylinder and having a piston rod adapted to be projected to tilt the bed, power transmitting means pivotally connected with the bed at a point normally lying at the inner side of said piston rod, and means actuated by the projection of the piston rod to move said power transmitting means and the piston rod toward a position of alinement with each other.

16. A dump car comprising an under body, a tilting bed mounted thereon, power operated means for tilting the bed to dump the load, including an oscillating cylinder mounted on the under body, a fluid pressure operated piston operating in said cylinder and having a piston rod adapted to be projected to tilt the bed, means actuated by the projection of the piston rod to swing the same toward the dumping side of the bed, a cross head connected with the piston rod, and a dumping member pivotally connected with said cross head, and pivotally connected with the bed between the axial line of said piston rod and the dumping side of the bed, said dumping member being adapted to be actuated by the projection of the piston to apply upward thrust to the bed at a point outside of its pivotal connection with the bed, during an early stage of the dumping operation, and to transmit upward thrust to the bed at a point nearer such pivotal connection at a later stage of the dumping operation, and a stop for limiting the movement of said dumping member toward the dumping side of the bed.

17. A dump car comprising an under body, a bed mounted thereon to be tilted in opposite directions to dump its load at either side of the car, power operated means at each side of the car for tilting the bed, each of said means including a fluid pressure operated piston rod adapted to be projected to tilt the bed, a cross head connected with the piston rod, a dumping member pivotally connected with said cross head, and pivotally connected with the bed between the axial line of said piston and the remote side of the bed, said dumping member being adapted to be actuated by the projection of the piston to apply upward thrust to the bed at a point outside of its pivotal connection with the bed, during an early stage of the dumping operation, and to transmit upward thrust to the bed at a point nearer such pivotal connection at a later stage of the dumping operation, and a stop for limiting the outward movement of the dumping member at the dumping side of the bed with respect to the piston associated therewith when the bed has been tilted substantially to its extreme position.

18. A dump car comprising an under-body, a tilting bed mounted thereon, power operated means for tilting the bed to dump the load, including a fluid pressure operated piston rod, means actuated by the projection of the piston rod to swing the same toward the dumping side of the bed during the latter part of the dumping operation, a crosshead connected with the piston rod, a dumping member pivotally supported intermediate its ends on said crosshead so as to form a relatively long lever arm extending in one direction and a relatively short lever arm extending in another direction, said relatively long lever arm being pivotally connected with the bed between the axial line of said piston rod and the remote side of the bed and the relatively short lever arm being adapted to transmit upwardly acting thrusting pressure to said bed in the first part of the dumping operation, and link mechanism pivotally connected to said underframe and having lost motion connection with the pivotal support of said dumping member, said link mechanism operating to limit upward movement of the short lever arm whereby tilting movement of the bed during the latter part of the dumping operation is effected entirely through the relatively long arm of said dumping member.

19. A dump car comprising an under body, a tilting bed mounted thereon, power operated means for tilting the bed to dump the load, including a fluid pressure operated piston, a dumping member pivotally connected with the bed to swing toward and from the dumping side thereof and adapted to bear against the bed at a point substantially midway between the pivotal connection therewith and the rising side of the bed to transmit upward thrust to the bed during an early stage of the dumping operation, and means for compelling said dumping member to swing about its pivotal support when the bed has been tilted to a predetermined angle to transmit upward thrust to the bed during a later stage of the dumping operation through said pivotal connection.

20. A dump car comprising an underbody, a tilting bed mounted thereon, power operated means for tilting the bed to dump the load, including means for applying upward thrust to the bed at a point comparatively remote from the dumping side thereof during an early stage of the dumping operation, and for shifting the point of application of said thrust to the bed toward its dumping side at a later stage of the dumping operation, and means operative during the tilting operation for shifting the pivotal center around which said bed tilts.

21. A dump car comprising an underbody, a tilting bed mounted thereon, power operated means for tilting the bed to dump the load, including a fluid pressure operated piston, means actuated by said piston to apply upward thrust to the bed at a point comparatively remote from the dumping side thereof during an early stage of the dumping operation, and to shift the point of application of said thrust to the bed toward its dumping side at a later stage of the dumping operation, and a plurality of pivots adapted to alternately support the bed during the dumping operation.

22. A dump car comprising an underbody, a tilting bed mounted thereon, power operated means for tilting the bed to dump the load, including a fluid pressure operated piston rod, a dumping member pivotally connected with the bed and actuated by projection of the piston rod to apply upward thrust to the bed at a point comparatively remote from the dumping side thereof during an early stage of the dumping operation, and to shift the point of application of said thrust to the bed toward its dumping side at a later stage of the dumping operation, and dual pivots at each side of the car adapted to alternately support the bed on said underbody during the dumping movement to either side.

23. A dump car comprising an under body, a tilting bed mounted thereon for tilting to either side of said under body, power operated means for tilting the bed to dump the load, including a fluid pressure operated piston rod adapted by its projection to apply upward thrust to the bed, and power transmitting means actuated by the projection of the piston rod to reduce its initial leverage upon the bed during a latter stage of the dumping operation, said piston rod being adapted to swing toward the lowering side of said bed during the latter part of said dumping operation.

24. A dump car comprising an under body, a tilting bed mounted thereon for tilting to either side of said under body, power operated means for tilting the bed to dump the load, including a fluid pressure operated piston rod adapted by its projection to apply upward thrust to the bed, and power operated means adapted to swing toward the dumping side of said bed during the latter part of the dumping operation and actuated by the projection of the piston rod and arranged for causing said bed to tilt under the influence of one force during the first part of the dumping operation and to continue its tilting movement under the influence of a lesser force during the latter part of the dumping operation.

25. A dump car comprising an under body, a tilting bed mounted thereon for tilting to either side of said under body, power operated means for tilting the bed to dump the load, including a fluid pressure operated piston rod adapted to swing toward the dumping side of the bed during the latter part of said dumping operation, and power transmitting means comprising a lever through which the power of said piston rod is transmitted to said bed, said lever acting to reduce the stroke of said piston rod and to correspondingly increase the force exerted upon the bed during the initial part of the dumping operation.

26. A dump car comprising an under body, a tilting bed mounted thereon and adapted to tilt to either side of said under body, power operated means for tilting the bed to dump the load, including a fluid pressure operated piston rod adapted to swing toward the dumping side of said bed during the latter part of said dumping operation, a member connected at one end with said under body, a second member fulcrumed on said under frame, and means connecting said members and actuated by the projection of said piston rod to apply upward thrust to the bed.

WILLIAM L. BURNER.